(12) United States Patent
Casper et al.

(10) Patent No.: US 8,573,319 B1
(45) Date of Patent: Nov. 5, 2013

(54) POSITION AND PRESSURE DEPTH CONTROL SYSTEM FOR AN AGRICULTURAL IMPLEMENT

(75) Inventors: Robert T. Casper, Ankeny, IA (US);
Shawn J. Becker, Ankeny, IA (US);
Jarrod R. Ruckle, Bondurant, IA (US);
Ricky B. Theilen, Altoona, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/528,173

(22) Filed: Jun. 20, 2012

(51) Int. Cl.
*A01B 63/111* (2006.01)

(52) U.S. Cl.
USPC ............................................................. 172/4

(58) Field of Classification Search
USPC ............ 172/4, 482, 311, 322, 2, 473; 91/405, 91/394, 395; 701/50; 111/200, 900
See application file for complete search history.

(56) References Cited

U.S. PATENT DOCUMENTS

| | | | |
|---|---|---|---|
| 4,355,688 A | 10/1982 | Hamm et al. | |
| 4,600,060 A | 7/1986 | Winter et al. | |
| 4,865,132 A * | 9/1989 | Moore Jr. | 172/196 |
| 5,012,415 A * | 4/1991 | Boe et al. | 701/50 |
| 5,143,159 A * | 9/1992 | Young et al. | 172/8 |
| 5,152,347 A * | 10/1992 | Miller | 172/7 |
| 5,300,918 A * | 4/1994 | Becker | 338/196 |
| 5,339,906 A * | 8/1994 | Fox et al. | 172/4 |
| 5,427,184 A | 6/1995 | Peck | |
| 5,653,292 A * | 8/1997 | Ptacek et al. | 172/4 |
| 5,957,218 A | 9/1999 | Noonan et al. | |
| 5,988,293 A | 11/1999 | Brueggen et al. | |
| 6,068,064 A | 5/2000 | Bettin et al. | |
| 6,076,611 A * | 6/2000 | Rozendaal et al. | 172/4 |
| 6,085,846 A * | 7/2000 | Buchl et al. | 172/4 |
| 6,129,155 A * | 10/2000 | Lombardi | 172/2 |
| 6,389,999 B1 * | 5/2002 | Duello | 111/200 |
| 6,460,623 B1 * | 10/2002 | Knussman et al. | 172/4 |
| 6,698,523 B2 | 3/2004 | Barber | |
| 6,701,857 B1 * | 3/2004 | Jensen et al. | 111/200 |
| 6,786,130 B2 | 9/2004 | Steinlage et al. | |
| 6,971,452 B2 * | 12/2005 | Ocsenknecht et al. | 172/439 |
| 7,063,167 B1 * | 6/2006 | Staszak et al. | 172/328 |
| 7,478,683 B2 | 1/2009 | Peck et al. | |
| 7,540,332 B2 * | 6/2009 | Friggstad et al. | 172/482 |
| 8,448,717 B2 * | 5/2013 | Adams et al. | 172/4 |
| 2009/0301743 A1 | 12/2009 | Henry et al. | |
| 2012/0048159 A1 * | 3/2012 | Adams et al. | 111/163 |
| 2012/0048160 A1 * | 3/2012 | Adams et al. | 111/163 |

* cited by examiner

*Primary Examiner* — Árpád Fábián-Kovács
(74) *Attorney, Agent, or Firm* — Quarles & Brady LLP

(57) ABSTRACT

A control system for an agricultural implement is disclosed. The control system includes a position sensor configured to measure a depth indication of an actual operating depth of a ground-engaging tool and configured to generate a corresponding position signal. A pressure sensor configured to measure a pressure indication of an actual operating pressure and configured to generate a corresponding pressure signal. An implement control unit configured to receive the position signal and the pressure signal and configured to control an adjustment device so that the depth indication targets a depth set point that is indicative of the pre-selected operating depth provided that the pressure indication is within a pre-selected pressure range.

22 Claims, 11 Drawing Sheets

POSITION AND PRESSURE DEPTH CONTROL SYSTEM FOR AN AGRICULTURAL IMPLEMENT

FIELD OF THE DISCLOSURE

The present disclosure generally relates to agricultural implements and more particularly to a position and pressure depth control system for an agricultural implement.

BACKGROUND OF THE DISCLOSURE

In order to provide depth control for agricultural implements, a position-based or pressure-based electro-hydraulic control system is commonly used. The control system is typically used to adjust depth of a single ground-engaging tool (e.g., disk gang assembly) or a single frame section (e.g., wing) across a width of the implement, transverse to a direction of travel. For example, John Deere's AccuDepth™ provides depth control across the width of the implement.

In a position-based electro-hydraulic control system, the control system seeks to maintain a constant position for the ground-engaging tool. In a pressure-based electro-hydraulic control system, the control system seeks to maintain a constant pressure for the ground-engaging tool. There is a need for a control system that allows a ground-engaging tool to change position if the ground-engaging tool strikes an object that is stuck in the ground and yet does not seek to apply a constant pressure as ground becomes softer.

SUMMARY OF THE DISCLOSURE

In one embodiment, a control system for an agricultural implement is disclosed. The agricultural implement includes a frame. A ground-engaging tool and an adjustment device are coupled to the frame. The adjustment device is configured to raise and lower the ground-engaging tool between a transport position and a pre-selected operating depth and configured to provide a pre-selected operating pressure.

The control system includes a position sensor. The position sensor is configured to measure a depth indication of an actual operating depth of a ground-engaging tool and configured to generate a corresponding position signal. A pressure sensor is configured to measure a pressure indication of an actual operating pressure and configured to generate a corresponding pressure signal. An implement control unit is configured to receive the position signal and the pressure signal and configured to control the adjustment device so that the depth indication targets a depth set point that is indicative of the pre-selected operating depth, provided that the pressure indication is within a pre-selected pressure range.

In another embodiment, a control system for an agricultural implement is disclosed. The agricultural implement includes a frame. A ground-engaging tool and an adjustment device are coupled to the frame. The adjustment device is configured to raise and lower the ground-engaging tool between a transport position and a pre-selected operating depth and configured to provide a pre-selected operating pressure.

The control system includes a position sensor. The position sensor is configured to measure a depth indication of an actual operating depth of the ground-engaging tool and configured to generate a corresponding position signal. A pressure sensor is configured to measure a pressure indication of an actual operating pressure and configured to generate a corresponding pressure signal. An implement control unit is configured to receive the position signal and the pressure signal and configured to control the adjustment device so that the pressure indication targets a pressure set point that is indicative of the pre-selected operating pressure, provided that the depth indication is within a pre-selected depth range.

In yet another embodiment, an agricultural implement is disclosed. The agricultural implement is adapted to be moved by a vehicle in a forward direction of travel. The agricultural implement includes a frame. A ground-engaging tool and an adjustment device are coupled to the frame. The adjustment device is configured to raise and lower the ground-engaging tool between a transport position and a pre-selected operating depth and configured to provide a pre-selected operating pressure.

A control system including a position sensor is configured to measure a depth indication of an actual operating depth of the ground-engaging tool and configured to generate a corresponding position signal. A pressure sensor is configured to measure a pressure indication of an actual operating pressure and configured to generate a corresponding pressure signal. An implement control unit is configured to receive the position signal and the pressure signal and configured to control the adjustment device so that the depth indication targets a depth set point that is indicative of the pre-selected operating depth, provided that the pressure indication is within a pre-selected pressure range.

In another embodiment, a method of controlling an agricultural implement is disclosed. The agricultural implement includes a frame. A ground-engaging tool and an adjustment device are coupled to the frame. The adjustment device is configured to raise and lower the ground-engaging tool between a transport position and a pre-selected operating depth and configured to provide a pre-selected operating pressure.

The method includes measuring a depth indication of an actual operating depth of the ground-engaging tool and generating a corresponding position signal. The method also includes measuring a pressure indication of an actual operating pressure and generating a corresponding pressure signal. The method further includes receiving the position signal and the pressure signal and controlling the adjustment device so that the depth indication targets a depth set point that is indicative of the pre-selected operating depth, provided that the pressure indication is within a pre-selected pressure range.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
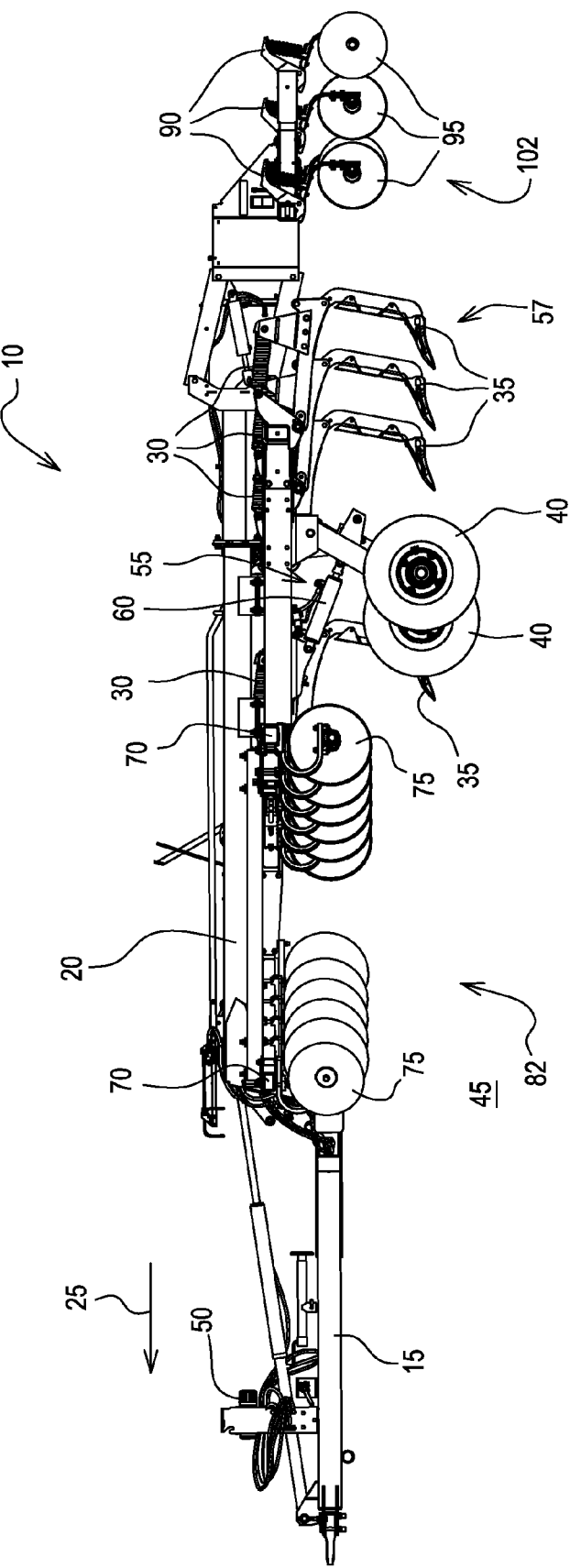
FIG. 1 is a side view of an agricultural implement in a transport position according to one embodiment.

FIG. 1 illustrates an agricultural implement 10 according to one embodiment. The illustrated agricultural implement 10 includes a coupling mechanism 15 for coupling to a vehicle (not shown).

A first frame section 20 is coupled to the coupling mechanism 15. The first frame section 20 extends rearwardly from the coupling mechanism 15 in a direction opposite of a direction of travel 25. A first ground-engaging tool 30 is coupled to the first frame section 20. The illustrated first ground-engaging tool 30 is a shank 35. Other ground-engaging tools (e.g., disks) are contemplated by this disclosure. A plurality of wheel assemblies 40 are coupled to the first frame section 20 to support the first frame section 20 above ground 45.

Illustratively, a controller 50 (e.g., electro-hydraulic) is coupled to the coupling mechanism 15. Alternatively, the controller 50 may be coupled to the first frame section 20. In the illustration shown, the controller 50 is configured to receive a source of hydraulic pressure (not shown).

Figure 2:
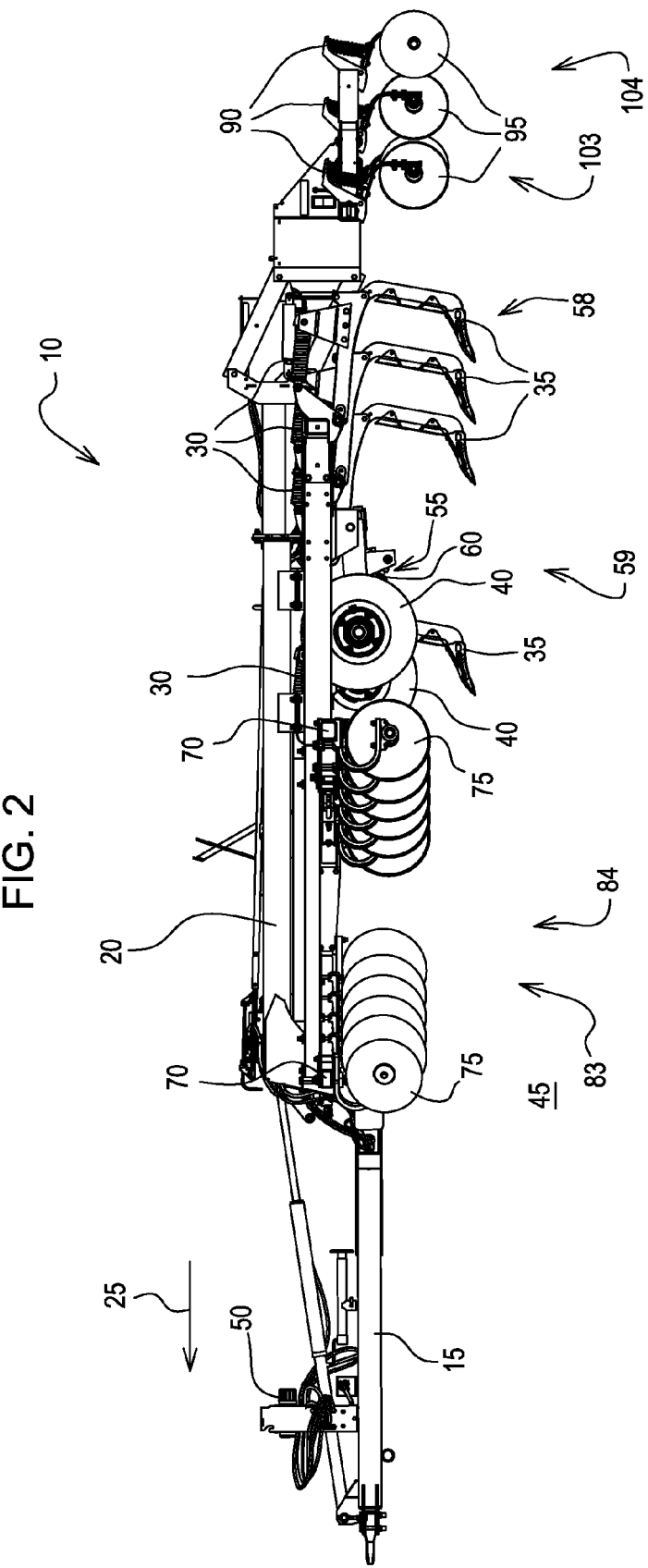
FIG. 2 is a side view of the agricultural implement of FIG. 1 in an operating position.

A first adjustment device 55 (e.g., extendable and retractable hydraulic cylinder) is coupled to the first frame section 20 and to the wheel assemblies 40. The first adjustment device 55 is in fluid communication with the controller 50 and configured for raising and lowering the first frame section 20 relative to the ground 45 to move the first ground-engaging tool 30 between a first ground-engaging tool transport position 57 and a first pre-selected operating depth 58 (FIG. 2). The first adjustment device 55 is also configured to provide a first pre-selected operating pressure 59 (FIG. 2) for the first ground-engaging tool 30. The illustrated first adjustment device 55 is an extendable and retractable hydraulic cylinder 60. Alternatively, the first adjustment device 55 may be coupled to the first frame section 20 and the first ground-engaging tool 30 to move the first ground-engaging tool 30 relative to the ground 45.

Figure 3:
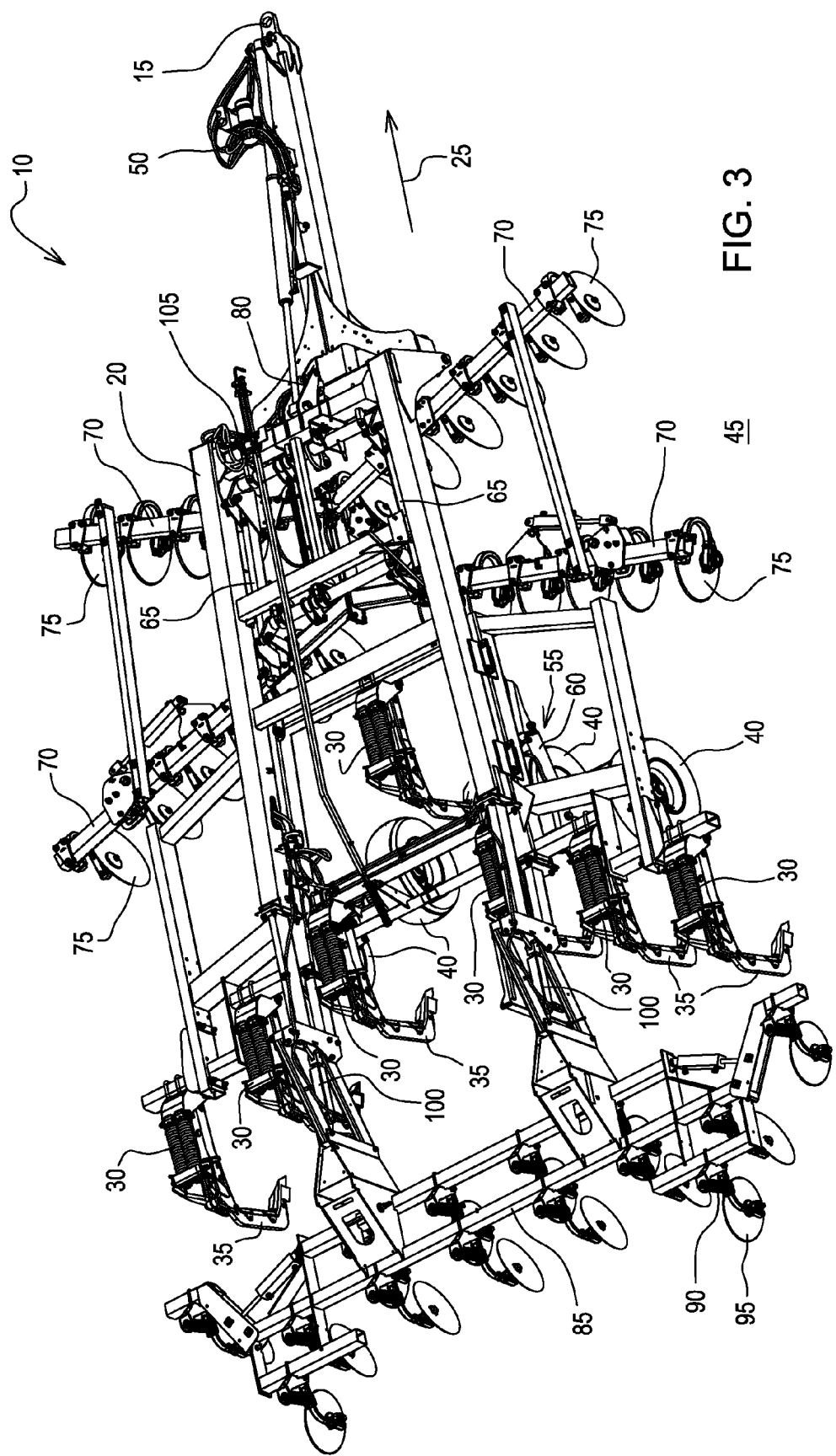
FIG. 3 is a perspective view of the agricultural implement of FIG. 1.

With reference to FIG. 3, a second frame section 65 is pivotally coupled to the first frame section 20 forward of the first ground-engaging tool 30. A second ground-engaging tool 70 is coupled to the second frame section 65. The illustrated second ground-engaging tool 70 is a disk gang assembly 75. Other ground-engaging tools (e.g., ripper) are contemplated by this disclosure.

Figure 4:
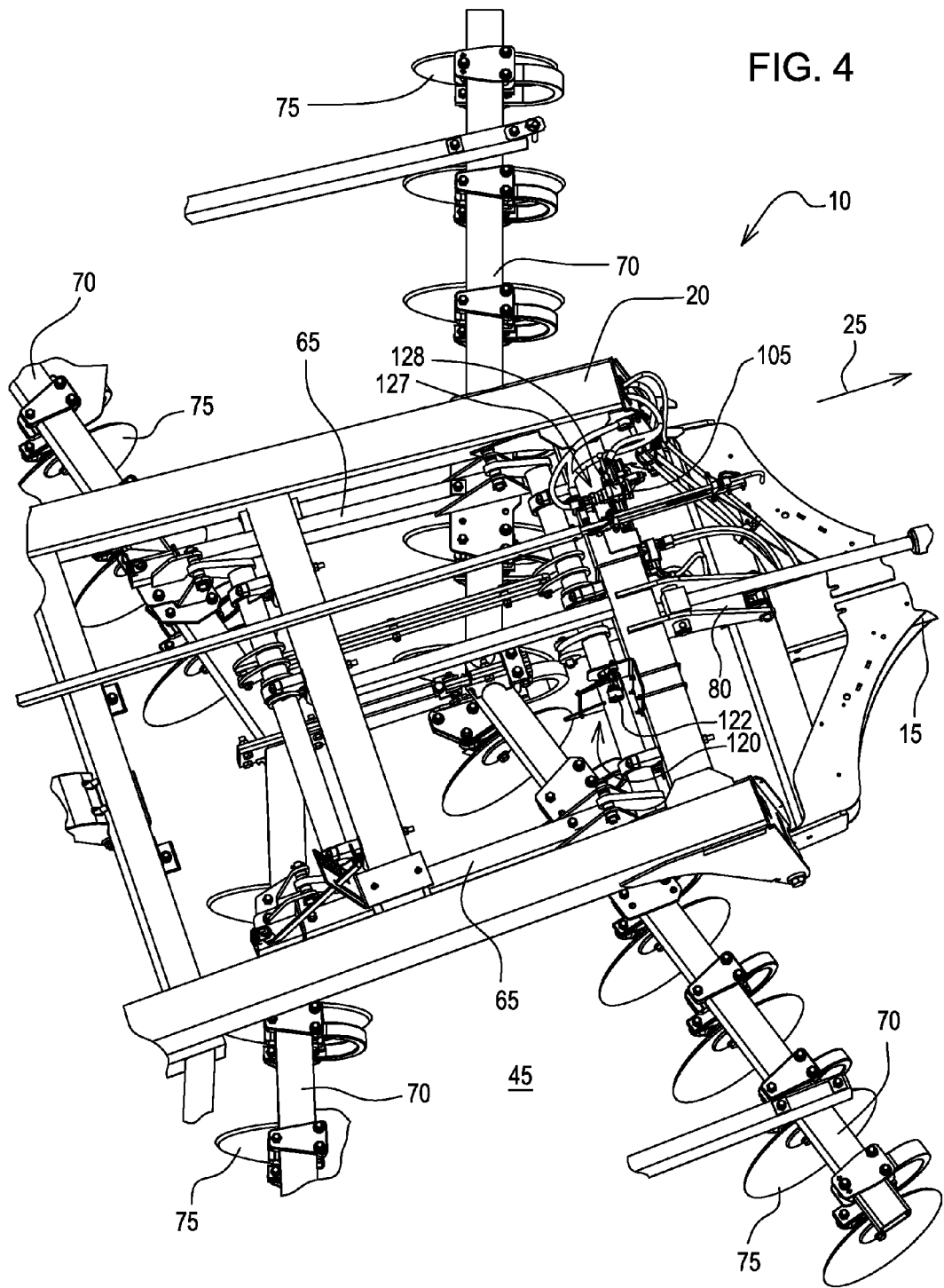
FIG. 4 is a perspective view of a portion of the agricultural implement of FIG. 1.

Referring to FIGS. 3 and 4, a second adjustment device 80 (e.g., extendable and retractable hydraulic cylinder) is coupled to the first frame section 20 and the second frame section 65. The illustrated second adjustment device 80 is in fluid communication with the controller 50 and configured to move the second ground-engaging tool 70 between a second ground-engaging tool transport position 82 (FIG. 1) and a second pre-selected operating depth 83 (FIG. 2) by moving the second frame section 65 relative to the first frame section 20. The second adjustment device 80 is also configured to provide a second pre-selected operating pressure 84 (FIG. 2) for the second ground-engaging tool 70. Alternatively, the second adjustment device 80 may be coupled to the second frame section 65 and the second ground-engaging tool 70 to move the second ground-engaging tool 70 relative to the ground 45.

With reference to FIG. 3, illustratively, a third frame section 85 is pivotally coupled to the first frame section 20, rearward of the first ground engaging tool 30. A third ground-engaging tool 90 is coupled to the third frame section 85. The illustrated third ground-engaging tool 90 is a closing disk assembly 95. Other ground-engaging tools (e.g., ripper, disk gang assembly) are contemplated by this disclosure.

A third adjustment device 100 (e.g., extendable and retractable hydraulic cylinder) is coupled to the first frame section 20 and the third frame section 85. The illustrated third adjustment device 100 is in fluid communication with the controller 50 and configured to move the third ground-engaging tool 90 between a third ground-engaging tool transport position 102 (FIG. 1) and a third pre-selected operating depth 103 (FIG. 2). The third adjustment device 100 is also configured to provide a third pre-selected operating pressure 104 (FIG. 2) for the third ground-engaging tool 90. Alternatively, the third adjustment device 100 may be coupled to the third frame section 85 and the third ground-engaging tool 90 to move the third ground-engaging tool 90 relative to the ground 45.

Figure 5:
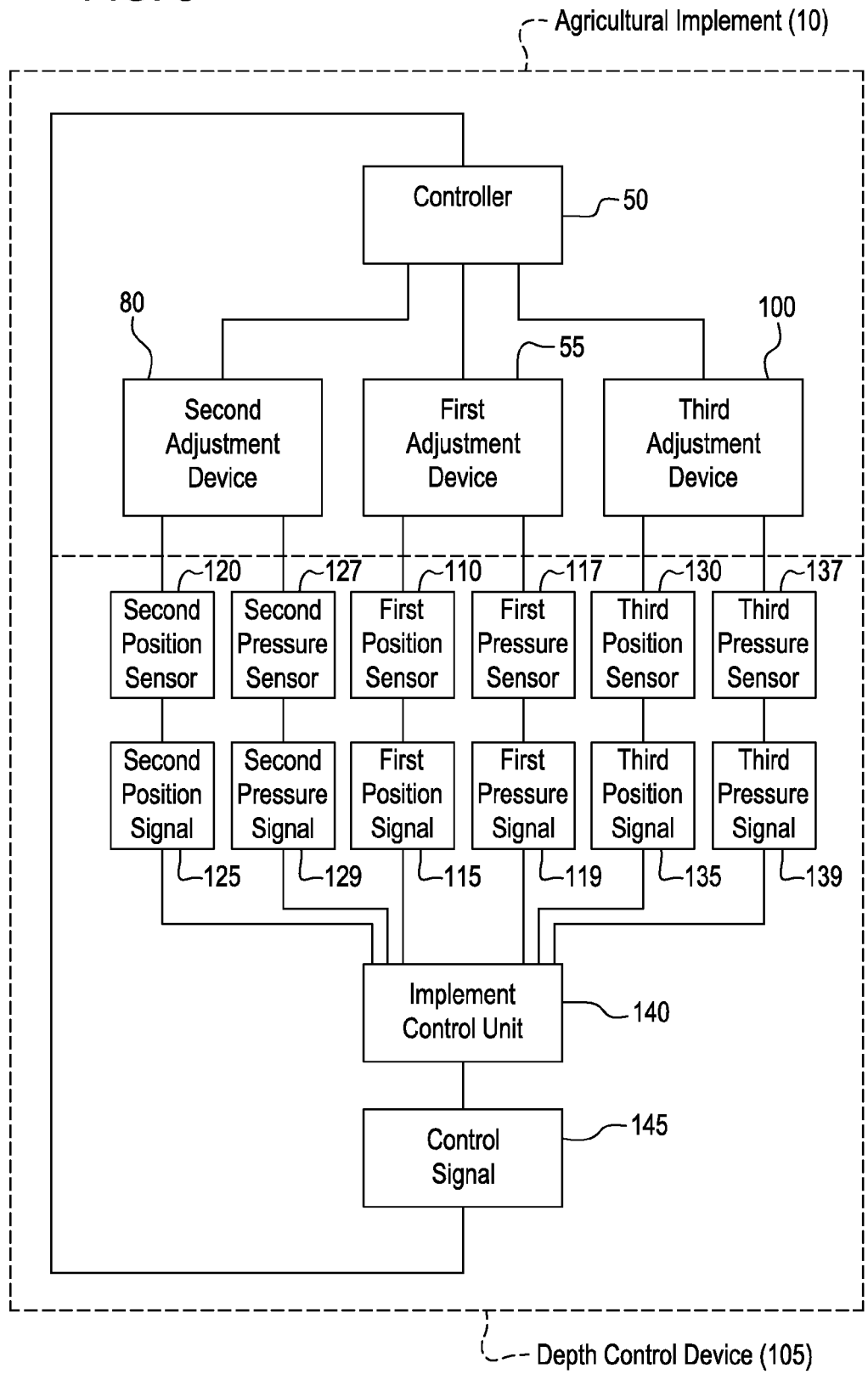
FIG. 5 is a diagrammatic view of the agricultural implement of FIG. 1.
Figure 6:
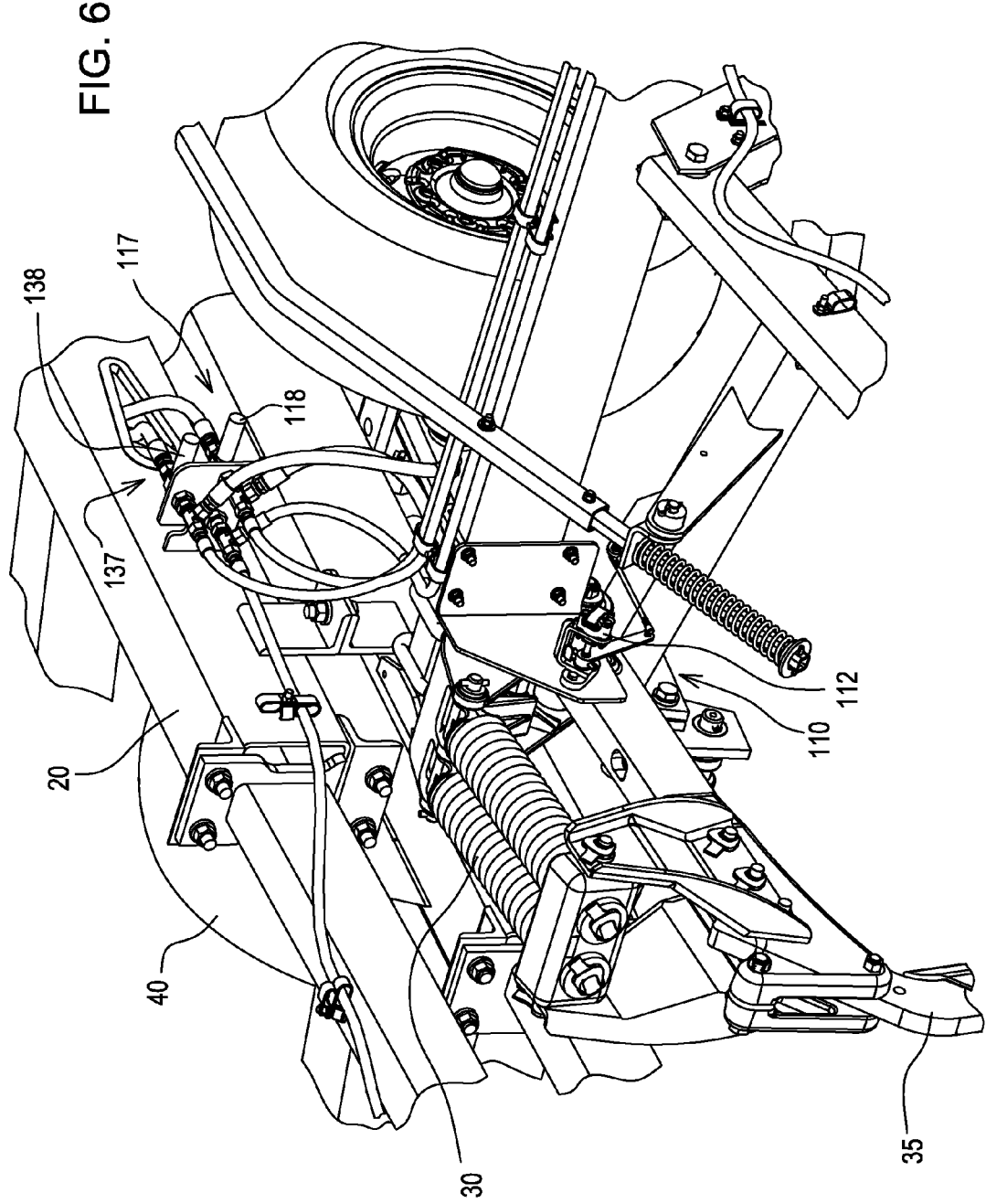
FIG. 6 is a perspective view of a portion of the agricultural implement of FIG. 1.

With continued reference to FIG. 3, a control system 105 is coupled to the agricultural implement 10. Illustratively, the control system 105 is coupled to the first frame section 20. Referring to FIGS. 5 and 6, the control system 105 includes a first position sensor 110 (e.g., hall effect rotational sensor, potentiometer) configured to measure a first depth indication (e.g., relative position) of an actual operating depth of the first ground-engaging tool 30 and configured to generate a corresponding first position signal 115. The illustrated first position sensor 110 is a first hall effect rotational sensor 112. Other types of the first position sensor 110 are contemplated by this disclosure.

A first pressure sensor 117 (e.g., pressure transducer, load cell, draft link, instrumented pin) is configured to measure a first pressure indication (e.g., line pressure) of an actual operating pressure of the first ground-engaging tool 30 and configured to generate a corresponding first pressure signal 119. The illustrated first pressure sensor 117 is a first pressure transducer 118. Other types of the first pressure sensor 117 are contemplated by this disclosure.

With reference to FIGS. 4 and 5, a second position sensor 120 (e.g., hall effect rotational sensor, potentiometer) is configured to measure a second depth indication (e.g., relative position) of an actual operating depth of the second ground-engaging tool 70 and configured to generate a corresponding second position signal 125. The illustrated second position sensor 120 is a second hall effect rotational sensor 122. Other types of the second position sensor 120 are contemplated by this disclosure.

A second pressure sensor 127 (e.g., pressure transducer, load cell, draft link, instrumented pin) is configured to measure a second pressure indication (e.g., line pressure) of an actual operating pressure of the second ground-engaging tool 70 and configured to generate a corresponding second pressure signal 129. The illustrated second pressure sensor 127 is a second pressure transducer 128. Other types of the second pressure sensor 127 are contemplated by this disclosure.

Figure 7:
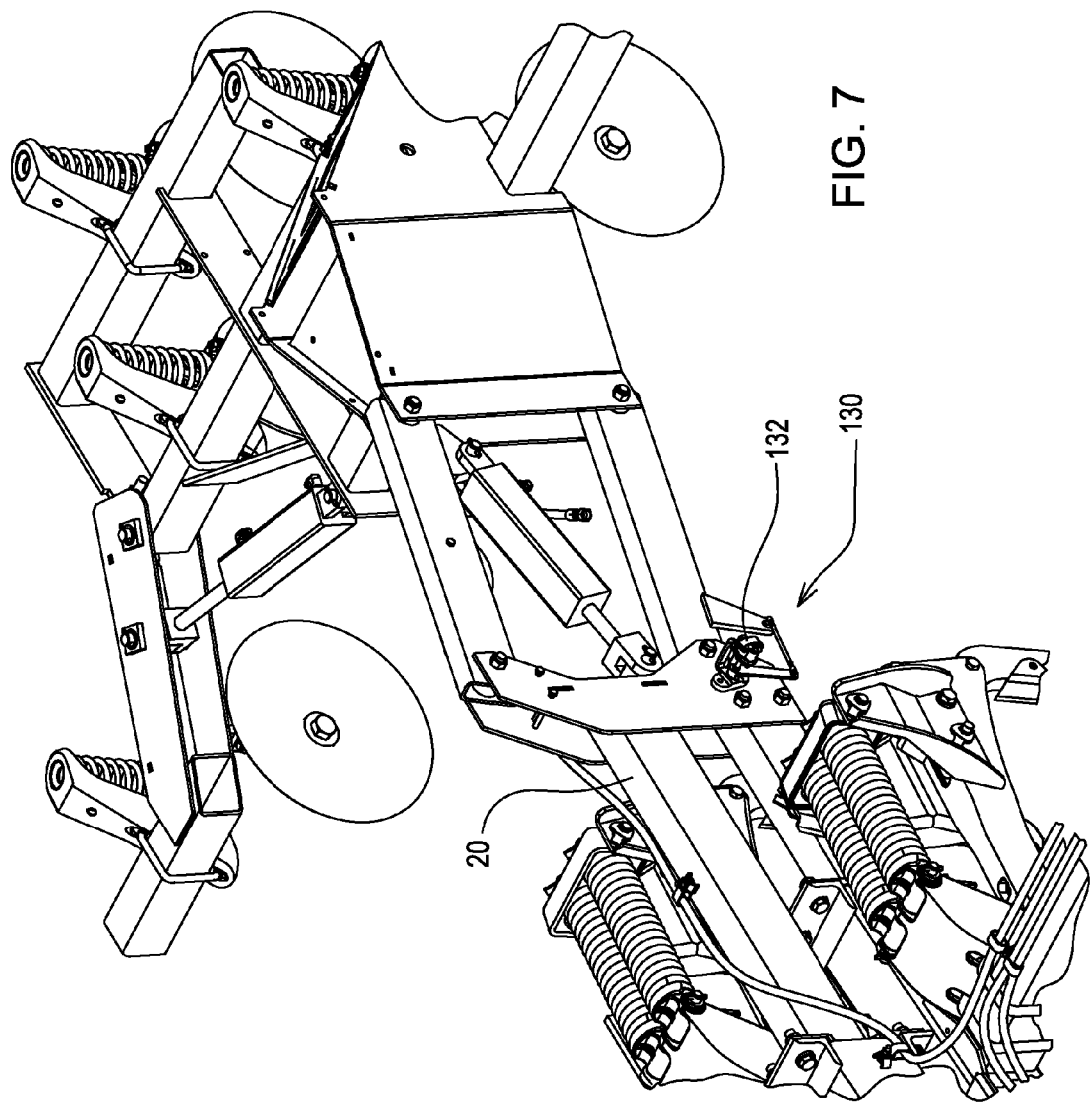
FIG. 7 is a side view of a portion of the agricultural implement of FIG. 1.

With reference to FIGS. 5-7, a third position sensor 130 (e.g., hall effect rotational sensor, potentiometer) is configured to measure a third depth indication (e.g., relative position) of an actual operating depth of the third ground-engaging tool 90 and configured to generate a corresponding third position signal 135. The illustrated third position sensor 130 is a third hall effect rotational sensor 132. Other types of the third position sensor 130 are contemplated by this disclosure.

A third pressure sensor 137 (e.g., pressure transducer, load cell, draft link, instrumented pin) is configured to measure a third pressure indication (e.g., line pressure) of an actual operating pressure of the third ground-engaging tool 90 and configured to generate a corresponding third pressure signal 139. The illustrated third pressure sensor 137 is a third pressure transducer 138. Other types of the third pressure sensor 137 are contemplated by this disclosure.

Referring to FIG. 5, an implement control unit 140 (e.g., PID controller), using open loop, closed loop, or preferably proportional-integral-derivative "PID" control methodology, is configured to receive the first, second, and third position signals 115, 125, 135 and the first, second, and third pressure signals 119, 129, 139, and generate a control signal 145, which is received by the controller 50.

In operation, the coupling mechanism 15 of the agricultural implement 10 is adapted to be pulled by the vehicle in the direction of travel 25. The agricultural implement 10 is divided into first, second, and third frame sections fore-to-aft 20, 65, 85 with first, second, and third ground-engaging tools 30, 70, 90 configured to operate at independent first, second, and third pre-selected operating depths 58, 83, 103. The first, second, and third pre-selected operating depths 58, 83, 103 and first, second, and third pre-selected operating pressures 59, 84, 104 of the first, second, and third ground-engaging tools 30, 70, 90 can be adjusted on the go manually, or via a GPS-enabled prescription map, or by a manufacturer suggested input to the implement control unit 140.

The implement control unit 140 receives the first, second, and third position signals 115, 125, 135 and the first, second, and third pressure signals 119, 129, 139, and generates a control signal 145, which adjusts the controller 50. The controller 50 then adjusts the first, second, and third adjustment devices 55, 80, 100.

The implement control unit 140 controls the controller 50 so that the depth indications target respective depth set points that are indicative of the respective pre-selected operating depths 58, 83, 103, provided that the pressure indications are within a pre-selected pressure range. The depth set points may have a tolerance range. The pre-selected pressure range may be a single-sided, double-sided, or band limit. Alternatively, a pre-selected pressure range may be set for the pressure indications of each of the first, second, and third ground-engaging tools 30, 70, 90. If the pressure indications are not within the pre-selected pressure range, or ranges, the implement control unit 140 is configured for controlling the adjustment devices 55, 80, 100 so that the depth indications deviate from the depth set points until the pressure indications are within the pre-selected pressure range or ranges.

Alternatively, the implement control unit 140 controls the controller 50 so that the pressure indications target respective pressure set points that are indicative of the respective pre-selected operating pressures 59, 84, 104, provided that the depth indications are within a pre-selected depth range. The pressure set points may have a tolerance range. The pre-selected depth range may be a single-sided, double-sided, or band limit. Alternatively, a pre-selected depth range may be set for the depth indications of each of the first, second, and third ground-engaging tools 30, 70, 90. If the depth indications are not within the pre-selected depth range, or ranges, the implement control unit 140 is configured for controlling the adjustment devices 55, 80, 100 so that the pressure indications deviate from the pressure set points until the depth indications are within the pre-selected depth range or ranges.

FIGS. 8-11 illustrate an agricultural implement 210 according to another embodiment. The agricultural implement 210 includes features similar to the agricultural implement 10 of FIGS. 1-7, and therefore, like components have been given like reference numbers plus 200 and only differences between the agricultural implements 10 and 210 will be discussed in detail below.

Figure 8:
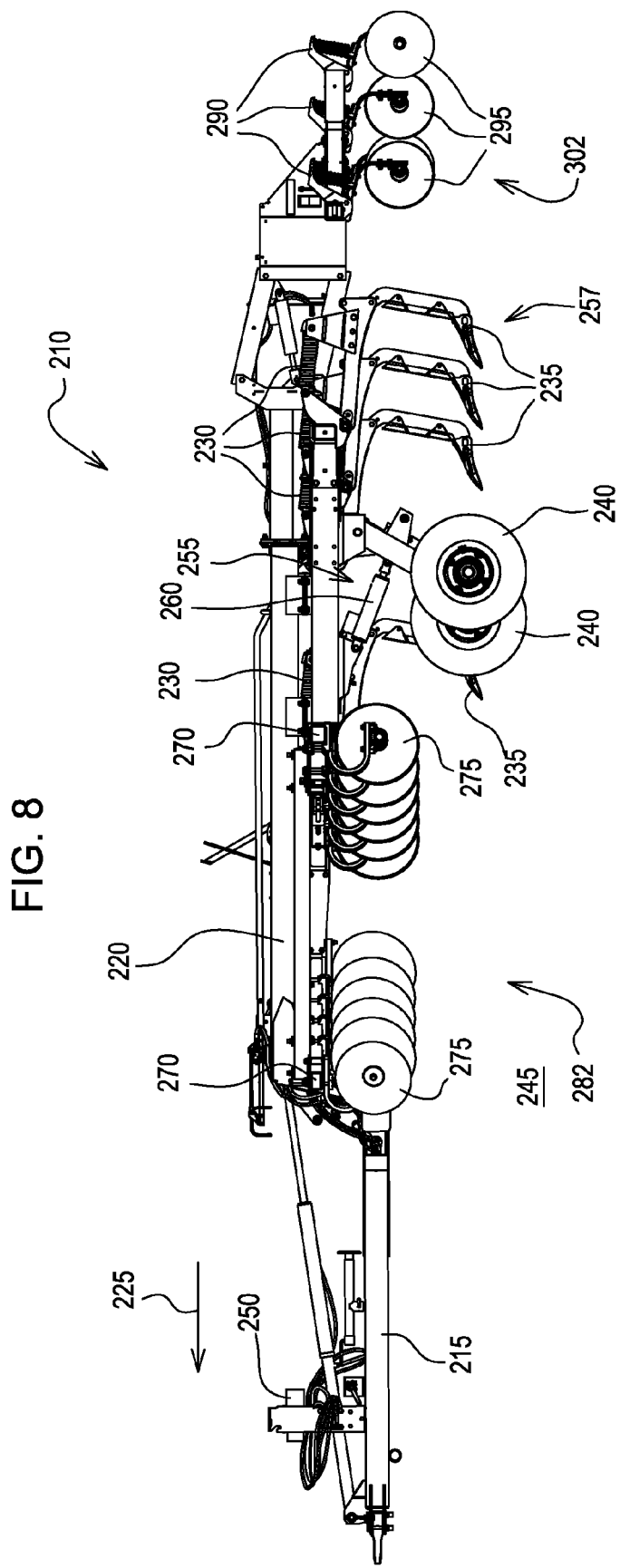
FIG. 8 is a side view of an agricultural implement in a transport position according to another embodiment.

With reference to FIG. 8, illustratively, an electronic controller 250 is coupled to a coupling mechanism 215. Alternatively, the electronic controller 250 may be coupled to a first frame section 220. In the illustration shown, the electronic controller 250 is configured to receive a source of electrical power (not shown).

Figure 9:
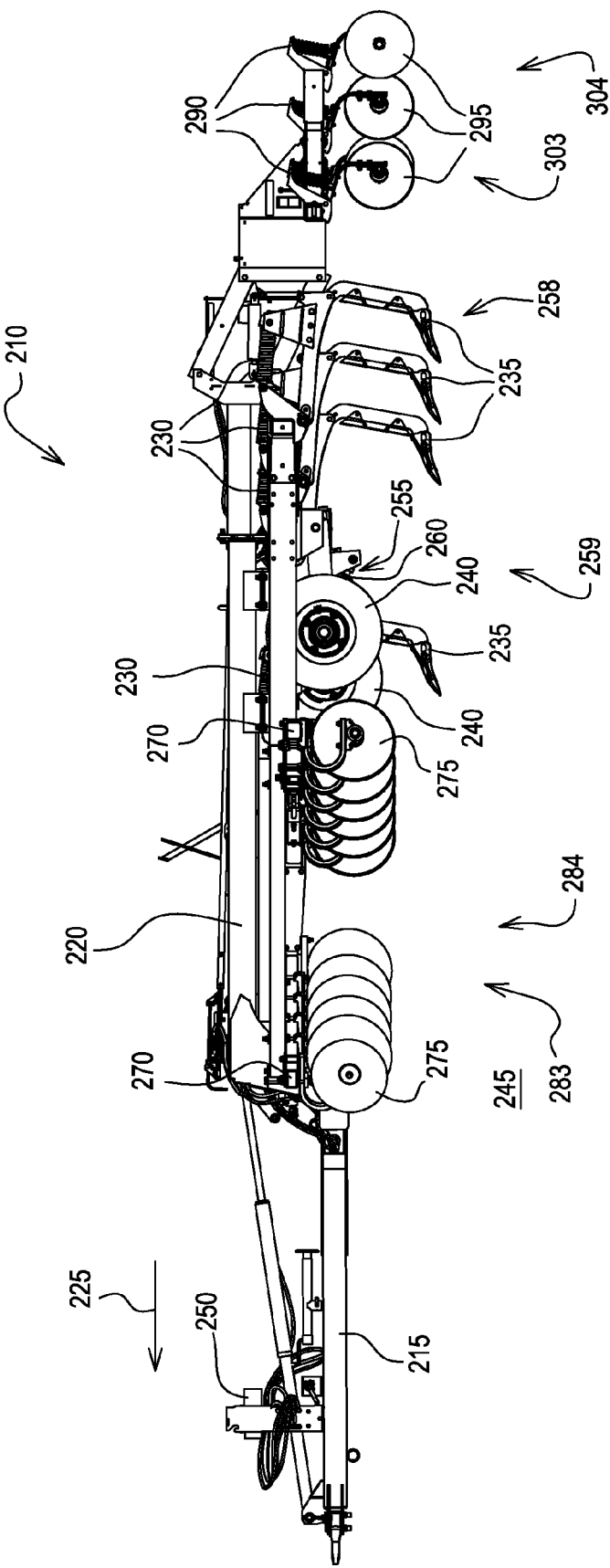
FIG. 9 is a side view of the agricultural implement of FIG. 8 in an operating position.

A first adjustment device 255 (e.g., electronic linear actuator, electronic rotational actuator) is coupled to the first frame section 220 and to a wheel assembly 240. The first adjustment device 255 is configured for communication with the electronic controller 250 and configured for raising and lowering the first frame section 220 relative to ground 245 to move a first ground-engaging tool 230 between a first ground-engaging tool transport position 257 and a first pre-selected operating depth 258 (FIG. 9). The first adjustment device 255 is also configured to provide a first pre-selected operating pressure 259 (FIG. 9) for the first ground-engaging tool 230. The illustrated first adjustment device 255 is a first adjustment device electronic linear actuator 260.

Figure 10:
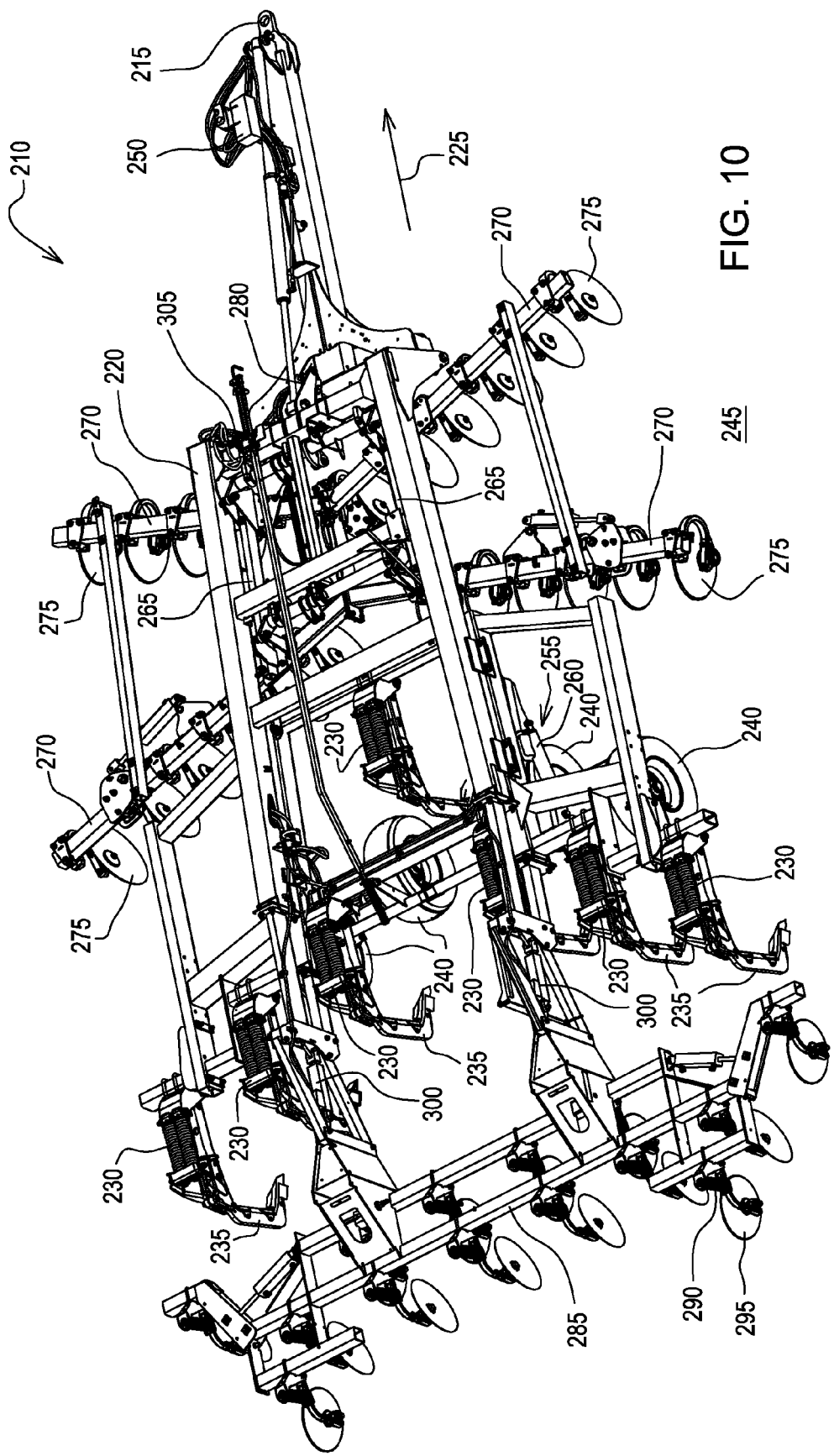
FIG. 10 is a perspective view of the agricultural implement of FIG. 8.

Referring to FIG. 10, a second adjustment device 280 (e.g., electronic linear actuator, electronic rotational actuator) is coupled to the first frame section 220 and a second frame section 265. The illustrated second adjustment device 280 is configured for communication with the controller 250 and configured to move a second ground-engaging tool 270 between a second ground-engaging tool transport position 282 (FIG. 8) and a second pre-selected operating depth 283 (FIG. 9) by moving the second frame section 265 relative to the first frame section 220. The second adjustment device 280 is also configured to provide a second pre-selected operating pressure 284 (FIG. 9) for the second ground-engaging tool 270. Alternatively, the second adjustment device 280 may be coupled to the second frame section 265 and the second ground-engaging tool 270 to move the second ground-engaging tool 270 relative to the ground 245.

With continued reference to FIG. 10, a third adjustment device 300 (e.g., electronic linear actuator, electronic rotational actuator) is coupled to the first frame section 220 and a third frame section 285. The illustrated third adjustment device 300 is configured for communication with the electronic controller 250 and configured to move a third ground-engaging tool 290 between a third ground-engaging tool transport position 302 (FIG. 8) and a third pre-selected operating depth 303 (FIG. 9). The third adjustment device 300 is also configured to provide a third pre-selected operating pressure 304 (FIG. 9) for the third ground-engaging tool 290. Alternatively, the third adjustment device 300 may be coupled to the third frame section 285 and the third ground-engaging tool 290 to move the third ground-engaging tool 290 relative to the ground 245.

Figure 11:
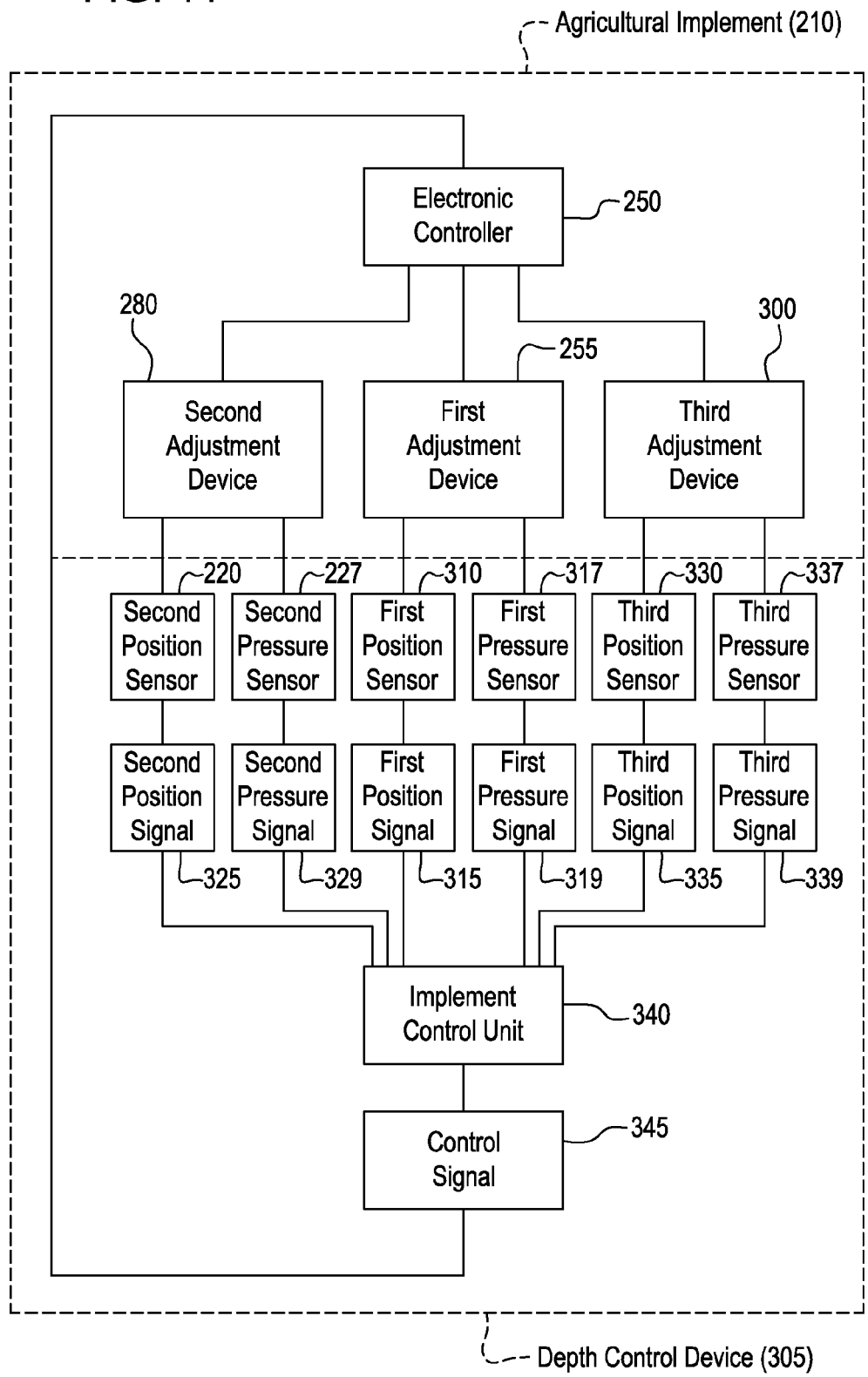
FIG. 11 is a diagrammatic view of the agricultural implement of FIG. 8.

Referring to FIG. 11, an implement control unit 340 (e.g., PID controller), using open loop, closed loop, or preferably proportional-integral-derivative "PID" control methodology, is configured to receive the first, second, and third position signals 315, 325, 335 and the first, second, and third pressure signals 319, 329, 339, and generate a control signal 345, which is received by the controller 250.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

Various features are set forth in the following claims.

What is claimed is:

1. A control system for an agricultural implement, the agricultural implement comprising a frame, a ground-engaging tool coupled to the frame, and an adjustment device coupled to the frame, the adjustment device configured for raising and lowering the ground-engaging tool between a transport position and a pre-selected operating depth and configured for providing a pre-selected operating pressure, the control system comprising:
    a position sensor configured for measuring a depth indication of an actual operating depth of the ground-engaging tool and configured for generating a corresponding position signal;
    a pressure sensor configured for measuring a pressure indication of an actual operating pressure and configured for generating a corresponding pressure signal; and
    an electronic or electro-hydraulic implement control unit configured for receiving the position signal and the pressure signal and configured for controlling the adjustment device so that the depth indication targets a depth set point that is indicative of the pre-selected operating depth, based upon, at least in part, determining whether the pressure indication is within a pre-selected pressure range.

2. The control system of claim 1, wherein if the pressure indication is not within the pre-selected pressure range, the implement control unit is configured for controlling the adjustment device so that the depth indication deviates from the depth set point until the pressure indication is within the pre-selected pressure range.

3. The control system of claim 1, wherein the implement control unit utilizes a PID control loop.

4. The control system of claim 1, wherein the position sensor is a hall effect rotational sensor.

5. The control system of claim 1, wherein the pressure sensor is a pressure transducer.

6. The control system of claim 1, wherein the depth set point has a tolerance range.

7. The control system of claim 1, wherein the pressure sensor is a load cell.

8. A control system for an agricultural implement, the agricultural implement comprising a frame, a ground-engaging tool coupled to the frame, and an adjustment device coupled to the frame, the adjustment device configured for raising and lowering the ground-engaging tool between a transport position and a pre-selected operating depth and configured for providing a pre-selected operating pressure, the control system comprising:
    a position sensor configured for measuring a depth indication of an actual operating depth of the ground-engaging tool and configured for generating a corresponding position signal;
    a pressure sensor configured for measuring a pressure indication of an actual operating pressure and configured for generating a corresponding pressure signal; and
    an electronic or electro-hydraulic implement control unit configured for receiving the position signal and the pressure signal and configured for controlling the adjustment device so that the pressure indication targets a pressure set point that is indicative of the pre-selected operating pressure, based upon, at least in part, determining whether the depth indication is within a pre-selected depth range.

9. The control system of claim 8, wherein if the depth indication is not within the pre-selected depth range, the implement control unit is configured for controlling the adjustment device so that the pressure indication deviates from the pressure set point until the depth indication is within the pre-selected depth range.

10. The control system of claim 8, wherein the implement control unit utilizes a PID control loop.

11. The control system of claim 8, wherein the position sensor is a hall effect rotational sensor.

12. The control system of claim 8, wherein the pressure sensor is a pressure transducer.

13. The control system of claim 8, wherein the pressure set point has a tolerance range.

14. The control system of claim 8, wherein the pressure sensor is a load cell.

15. An agricultural implement adapted to be moved by a vehicle in a forward direction of travel, the agricultural implement comprising:
    a frame;
    a ground-engaging tool coupled to the frame;
    an adjustment device coupled to the frame and configured for raising and lowering the ground-engaging tool between a transport position and a pre-selected operating depth and configured for providing a pre-selected operating pressure; and
    a control system comprising a position sensor configured for measuring a depth indication of an actual operating depth of the ground-engaging tool and configured for generating a corresponding position signal, a pressure sensor configured for measuring a pressure indication of an actual operating pressure and configured for generating a corresponding pressure signal, and an electronic or electro-hydraulic implement control unit configured for receiving the position signal and the pressure signal and configured for controlling the adjustment device so that the depth indication targets a depth set point that is indicative of the pre-selected operating depth, based upon, at least in part, determining whether the pressure indication is within a pre-selected pressure range.

16. The agricultural implement of claim 15, wherein if the pressure indication is not within the pre-selected pressure range, the implement control unit is configured for controlling the adjustment device so that the depth indication deviates from the depth set point until the pressure indication is within the pre-selected pressure range.

17. The agricultural implement of claim 15, wherein the implement control unit utilizes a PID control loop.

18. The agricultural implement of claim 15, wherein the position sensor is a hall effect rotational sensor.

19. The agricultural implement of claim 15, wherein the pressure sensor is a pressure transducer.

20. The agricultural implement of claim 15, wherein the depth set point has a tolerance range.

21. A method of controlling an agricultural implement, the agricultural implement comprising a frame, a ground-engaging tool coupled to the frame, and an adjustment device coupled to the frame, the adjustment device configured for raising and lowering the ground-engaging tool between a transport position and a pre-selected operating depth and configured for providing a pre-selected operating pressure, the method comprising:

measuring a depth indication of an actual operating depth of the ground-engaging tool;

generating a corresponding position signal;

measuring a pressure indication of an actual operating pressure;

generating a corresponding pressure signal;

receiving the position signal and the pressure signal; and controlling the adjustment device so that the depth indication targets a depth set point that is indicative of the pre-selected operating depth, based upon, at least in part, determining whether the pressure indication is within a pre-selected pressure range.

22. The method of claim 21, further comprising controlling the adjustment device so that the depth indication deviates from the depth set point until the pressure indication is within the pre-selected pressure range, if the pressure indication is not within the pre-selected pressure range.

\* \* \* \* \*